United States Patent

Nanko

[11] 4,253,136
[45] Feb. 24, 1981

[54] SWITCHING REGULATED POWER SUPPLY APPARATUS INCLUDING A RESONANT CIRCUIT

[75] Inventor: Hideaki Nanko, Nishinomiya, Japan

[73] Assignee: Sanyo Electric Co., Ltd., Osaka, Japan

[21] Appl. No.: 860,225

[22] Filed: Dec. 13, 1977

[30] Foreign Application Priority Data

Dec. 20, 1976 [JP] Japan .............................. 51-155792

[51] Int. Cl.³ ........................................ H02M 3/335
[52] U.S. Cl. .................................................. 363/21
[58] Field of Search ............ 323/17, DIG. 1; 363/18, 363/19, 20, 21

[56] References Cited

U.S. PATENT DOCUMENTS

| | | | |
|---|---|---|---|
| 3,790,878 | 2/1974 | Brokaw | 323/17 |
| 3,828,239 | 8/1974 | Nagai et al. | 363/20 |
| 3,859,590 | 1/1975 | Cielo et al. | 323/17 |
| 3,928,793 | 12/1975 | Waltz | 363/19 |
| 3,989,995 | 11/1976 | Peterson | 323/17 |
| 4,027,200 | 5/1977 | Sahara et al. | 363/20 X |
| 4,142,082 | 2/1979 | Israel | 323/17 X |
| 4,163,278 | 7/1979 | Onoue et al. | 363/21 X |

FOREIGN PATENT DOCUMENTS 528556  9/1976  U.S.S.R. .......................... 323/DIG. 1

*Primary Examiner*—A. D. Pellinen
*Attorney, Agent, or Firm*—Armstrong, Nikaido, Marmelstein & Kubovcik

[57] ABSTRACT

A switching regulated power supply apparatus, comprising: an alternative current power source, a first rectifier for rectifying the alternate current output, a high frequency reference pulse generator, a pulse width modulator for modulating the pulse width of the reference pulse output as a function of a control signal, a switching transistor for on/off controlling the output from the first rectifier as a function of the pulse width modulated output, a high frequency transformer connected in series with the first rectifier and the switching transistor, a second rectifier for rectifying the output from the high frequency transformer, and a smoothing circuit for smoothing the output from the second rectifier, the output from the smoothing circuit being applied to the pulse width modulator as a control signal, characterized in that the said apparatus further comprises a resonance capacitor coupled to the said high frequency transformer for causing resonance cooperatively with the said high frequency transformer when the said switching transistor is turned off, and a switching device coupled to the output of the second rectifier to be turned on responsive to a flyback pulse obtained from the smoothing circuit when the switching transistor is turned off, whereby the said resonance is suppressed by means of the second rectifier and the switching device in the latter half cycle of the resonance during the off time period of the switching transistor.

15 Claims, 9 Drawing Figures

SWITCHING REGULATED POWER SUPPLY APPARATUS INCLUDING A RESONANT CIRCUIT

BACKGROUND OF THE INVENTION

1. Field of the Invention

The present invention relates to a switching regulated power supply apparatus. More specifically, the present invention relates to an improvement in a switching regulated power supply apparatus wherein a direct current voltage obtained through rectification of a commercial alternate current power supply input is applied to a direct current/alternate current converting circuit implemented by a series connection of a switching device on/off controlled as a function of the pulse which is modulated of the pulse width responsive to the output of the converting circuit and a transformer, whereupon the converted alternate current output is rectified and smoothed to provide a direct current constant voltage.

2. Description of the Prior Art

A variety of types of switching regulated power supply apparatuses were proposed and put into practical use. Such switching regulated power supply apparatuses may be classified depending on the type of the direct current/alternate current converting circuit, a driving system of the switching device, presence or absence of a transformer, a circuit configuration of the constant voltage control, and the like. Most typical prior art switching regulated power supply apparatuses comprise those of a chopper type, as shown in FIG. 1, and those of an opposite polarity operation converter type, as shown in FIG. 2.

More specifically, FIG. 1 shows a schematic diagram of a conventional chopper type switching regulated power supply apparatus. Referring to FIG. 1, the switching regulated power supply apparatus shown comprises a rectifier 4 coupled to receive an alternate current output from a commercial alternate current power supply 3. The output of the rectifier 4 is shunted by a capacitor 5 which serves as a smoothing circuit. The output of the rectifying and smoothing circuit is connected through a switching transistor 50 to a smoothing circuit comprising a choke coil 11 the input of which is shunted by a diode 51 and the output of which is shunted by a capacitor 12. Both terminals of the capacitor 12 are connected to the direct current output terminals 15 and 15. A potentiometer implemeted by the resistors 13 and 14 is connected across the capacitor 12. The voltage dividing terminal of the potentiometer is connected to an error detector 16 for detecting fluctuation of the voltage across the capacitor 12 with respect to a given reference voltage as an error signal, which is applied to a pulse width modulator 18. The pulse width modulator 18 is responsive to the output of a pulse oscillator 17 and the output of the error detector 16 to provide a train of high frequency pulses the pulse width of which is modulated as a function of fluctuation of the direct current output developed across the capacitor 12. The said train of high frequency pulses from the pulse modulator 18 is applied to a driver 19 and is amplified thereby. The output from the driver 19 is applied to a control electrode of the switching transistor 50 to control the conduction of the transistor 50 and thus the duty cycle of the switching control.

The FIG. 1 switching regulated power supply apparatus, however, suffers from several shortcomings. More specifically, with the FIG. 1 switching regulated power supply apparatus, only an output direct current voltage which is lower than the input direct current voltage can be obtained. Since a switching transistor is interposed between the input direct current source and the output terminal, there is a fear the short-circuiting damage of the switching transistor causes the input direct current voltage to appear at the output terminal, which threatens to damage in turn the load circuit. Since a switching transistor should be interposed between the input terminal and the output terminal, it is impossible to electrically isolate the input and output.

FIG. 2 shows a schematic diagram of a typical opposite polarity operation converter type. Referring to FIG. 2, the converter shown utilizes a high frequency transformer which is connected in series with a switching transistor. More specifically, the output of the rectifying and smoothing circuit is connected to a primary winding 60a of the transformer 60 which is connected in series with a switching transistor 61, the control electrode of which is connected to receive the output of the driver 19. The secondary winding 60b of the transformer 60 is connected to another rectifier 9, the output of which is smoothed by the smoothing capacitor 12. Since the remaining portions of the FIG. 2 converter are substantially the same as those in the FIG. 1 apparatus, it is not believed necessary to describe them in more detail.

Again, the converter shown in FIG. 2 suffers from several shortcomings. More specifically, with the FIG. 2 converter, the input direct current voltage is switched in the rectangular switching wave form. However, such a switching operation in a rectangular switching wave form is liable to cause an increased switching loss and undesired radiation. If and when the load is instantaneously short-circuited, the switching transistor comes outside a stabilized operation region of the voltage/current characteristic of the switching transistor, which threatens to damage the switching transistor. If electrical isolation between the primary and secondary windings of the transformer is improved by increasing the spacing therebetween, then a leakage inductance between the primary and the secondary windings is increased, which in turn induces ringing phenomenon in the output voltage of the transformer and causes undesired radiation and an increased switching loss of the switching transistor.

Thus, it is desired that an improved switching regulated power supply apparatus is provided wherein such shortcomings as discussed above are eliminated. The present invention achieves that purpose.

SUMMARY OF THE INVENTION

Briefly described, the present invention comprises a switching regulated power supply apparatus, comprising an alternate current power source, a first rectifier for rectifying the alternate current output, a high frequency reference pulse generator for generating high frequency pulses the duty cycle of which is variable as a function of a control signal, a first switching device for on/off controlling the output from the first rectifier as a function of the duty cycle of the high frequency reference pulses, a high frequency transformer connected in series with the first rectifier and the first switching device, a second rectifier for rectifying the output from the high frequency transformer, and a smoothing circuit for smoothing the output from the second rectifier, the rectified and smoothed output from the second rectifier being applied to the high frequency reference pulse generator as a control signal, characterized in that the apparatus further comprises a resonance capacitor coupled to the high frequency transformer for causing resonance cooperatively with the high frequency transformer when the first switching device is turned off and a second switching device coupled to the output of the high frequency transformer to be turned on responsive to a flyback pulse obtained from the smoothing circuit when the first switching device is turned off. As a result, the above described resonance is suppressed by means of the second rectifier and the second switching device in the latter half cycle of the resonance during the off time period of the first switching device. According to the present invention, the switching wave form in the primary winding of the high frequency transformer is rounded as compared with the rectangular wave form in the prior art apparatus by virtue of the above described resonance caused by the high frequency transformer and the resonance capacitor.

Therefore, a principal object of the present invention is to provide an improved switching regulated power supply apparatus of a converter type employing a converter transformer, wherein a switching loss by the switching device is decreased.

Another object of the present invention is to provide an improved switching regulated power supply apparatus of a converter type employing a converter transformer, wherein undesired high frequency radiation is suppressed.

According to an aspect of the present invention, since a converter transformer is employed, electrical isolation is assuredly achieved between the input alternate current power source and the output terminal and an alternate current power source of any voltage can be used for a predetermined output direct current voltage by properly selecting the turn ratio of the primary and secondary windings of the high frequency transformer.

According to another aspect of the present invention, since a converter transformer is employed, even if the first and/or second switching device provided at the primary and/or secondary winding side undergo short-circuiting or open-circuiting damage, no influence appears at the output voltage, with the result of no fear that the load circuit is damaged by virtue of the damage of these switching devices.

According to a further aspect of the present invention, since the inductance value of the primary winding of the converter transformer can be selected to a relatively large value, the impedance value of the primary winding of the converter transformer becomes accordingly large, which decreases a loss occurring in the first switching device.

Because of the above described features and aspects of the present invention, the inventive switching regulated power supply apparatus can be advantageously used as a power supply apparatus of electronic equipment such as television receivers and the like which requires a stabilized direct current voltage as a power source.

These objects and other objects, features, aspects and advantages of the present invention will become more apparent from the following detailed description when taken in conjunction with the accompanying drawings.

DESCRIPTION OF THE PREFERRED EMBODIMENTS

Figure 1:
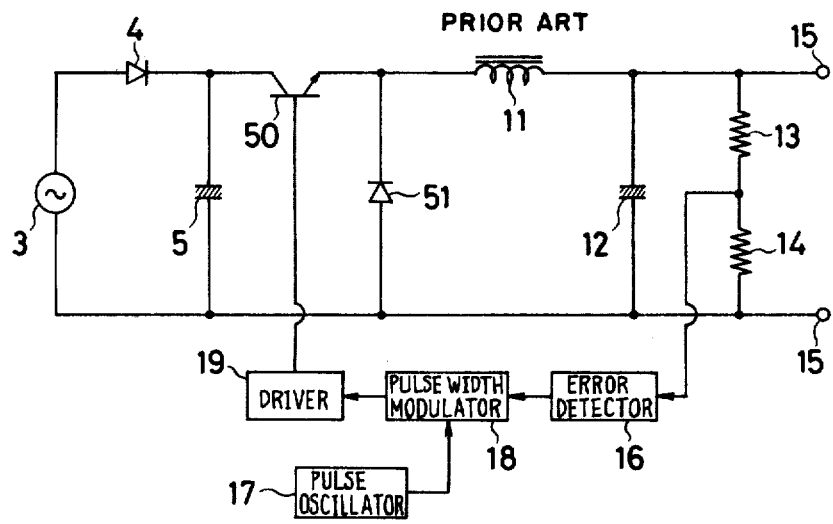
FIG. 1 shows a schematic diagram of a prior art switching regulated power supply apparatus of a chopper type.
Figure 2:
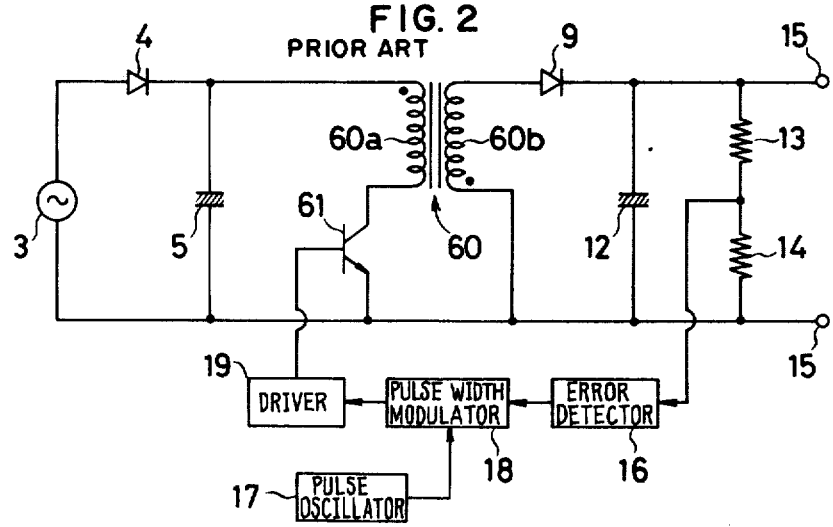
FIG. 2 shows a schematic diagram of a prior art switching regulated power supply apparatus of a reverse polarity operation converter type.
Figure 3A:
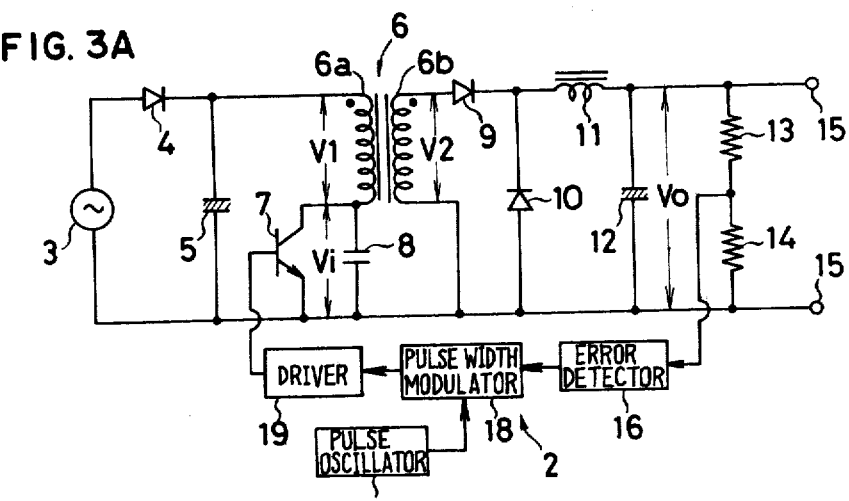
FIG. 3A shows a schematic diagram of one embodiment of a switching regulated power supply apparatus in accordance with the present invention.
Figure 3B:
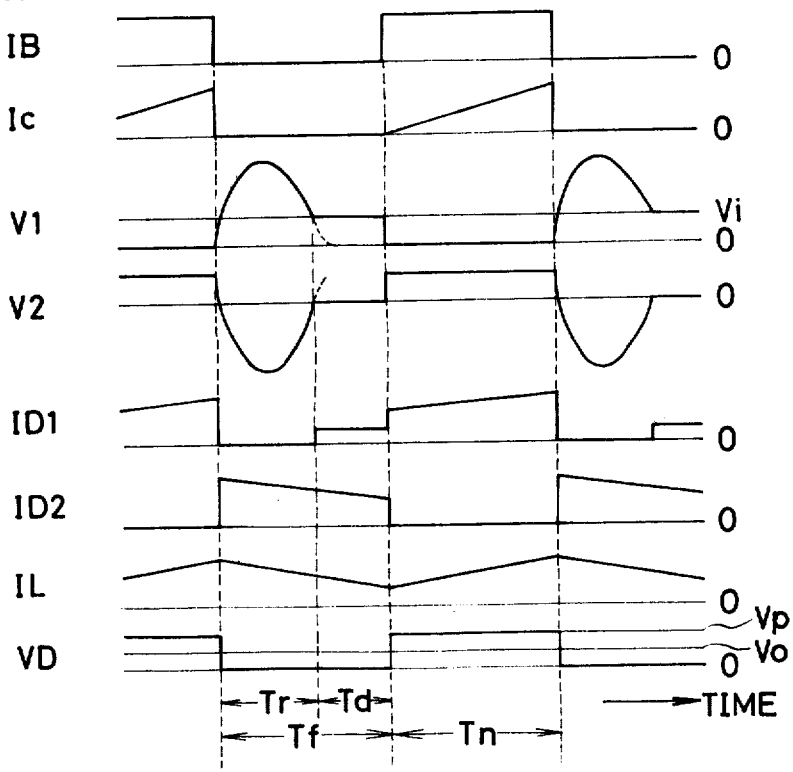
FIG. 3B shows wave forms of the signals appearing at the several portions of the FIG. 3A embodiment.

FIG. 3A shows a schematic diagram of one embodiment of a switching regulated power supply apparatus in accordance with the present invention, wherein a same polarity operation type converter is employed. FIG. 3B shows wave forms of the electrical signals appearing at several portions of the FIG. 3A embodiment. Referring to FIG. 3A, the switching regulated power supply apparatus shown comprises a rectifier 4 coupled to receive an alternate current output from a commercial alternate current power supply 3. The output of the rectifier 4 is shunted by a capacitor 5 which serves as a smoothing circuit. The output of the rectifying and smoothing circuit is connected to the primary winding 6a of a high frequency transformer 6 which is connected in series with a switching transistor 7. A secondary winding 6b of the high frequency transformer 6 is connected to another rectifier 9, the output of which is connected to a smoothing circuit comprising a choke coil 11 and a capacitor 12. In the embodiment shown, the primary and secondary windings 6a and 6b of the transformer 6 are wound in the same polarity, as shown in the dot mark in the figure. The series connection of the secondary winding and the rectifier 9 is shunted by a diode 10 connected in such a polarity that the cathode of the diode 10 is connected to the cathode of the rectifying diode 9. Both terminals of the capacitor 12 are connected to the output terminals 15 and 15. A potentiometer implemented by the resistors 13 and 14 is connected across the capacitor 12. The voltage dividing terminal of the potentiometer is connected to an error detector 16 for detecting fluctuation of the output voltage across the capacitor 12 with respect to a given reference voltage as an error signal, which is applied to a pulse width modulator 18. A high frequency pulse generator 17 is also connected to the pulse width modulator 18. The pulse width modulator 18 is responsive to the output of the pulse generator 17 and the output of the error detector 16 to modulate the pulse width of a train of high frequency pulses as a function of the direct current output developed across the capacitor 12. The train of high frequency pulses from the pulse modulator 18, as the pulse width modulated, is applied to a driver 19 and is amplified. The output from the driver 19 is applied to a control electrode of the switching transistor 7 to control the conduction of the transistor 7 and thus the duty cycle of the switching control. According to one aspect of the present invention, a resonant capacitor 8 is connected in series with the primary winding 6a of the high frequency transformer 6, such that resonance occurs with the capacitor 8 and the primary winding 6a of the high frequency transformer 6. Preferably, the capacitance value of the capacitor 8 is selected such that the half cycle of the resonance by the capacitor 8 and the primary winding 6a of the transformer 6 is slightly shorter than the off time period of the switching transistor 7. For the reasons to be described subsequently, it is preferred that the primary and secondary windings 6a and 6b of the high frequency transformer 6 are closely coupled and the overall inductance value of the transfomer 6 as viewed from the primary winding 6a to the secondary winding 6b, including the choke coil 11, is selected to be relatively large.

The operation of the FIG. 3A embodiment will be better understood with reference to FIG. 3B, which shows wave forms of the electrical signals appearing at various portions of the FIG. 3A embodiment. When the base current of IB of the switching transistor 7 varies responsive to the output of the driver 19, the transistor 7 is on/off controlled repeatedly. During the on time period Tn of the transistor 7, the collector current Ic of the transistor 7 flows through the primary winding 6a of the transformer 6, whereby the secondary voltage V2 is developed across the secondary winding 6b of the transformer 6. The diode 9 becomes conductive during the on time period Tn of the transistor 7 by virtue of the positive secondary voltage V2, whereby the diode current ID1 flows through the choke coil 11, while the other diode 10 is reverse biased and is turned off, with the result that the voltage VD is developed across the diode 10, as shown.

If and when the switching transistor 7 is turned off, resonance is initiated with the inductance of the primary winding 6a of the tranformer 6 and the capacitance of the capacitor 8 during the off time period of the switching transistor 7. Thus, the primary voltage V1 of the resonance curve as shown in FIG. 3B is developed across the primary winding 6a, which accordingly induces the secondary voltage V2 of the opposite polarity. As a result, the rectifying diode 9 is turned off by virtue of the above described secondary voltage of the opposite polarity. The resonance is about to continue for the time being. However, at the end of the fist half cycle period Tr of the resonance curve, the primary voltage V1 is about to become lower than the input voltage Vi, as shown in the dotted line, and accordingly the secondary voltage V2 is about to become higher than the ground level, as shown in the dotted line, just when the diode 9 is turned on.

On the other hand, the energy stored in the choke coil 11 as a function of the choke coil current ID1 that flows during the on time period Tn now comes to appear in the form of a flyback pulse of the negative polarity, not shown, across the diode 10 during the off time period Tf, which causes the diode 10 to be turned on during the off time period Tf of the switching transistor 7, with the result that the diode current ID2 flows through the diode 10 during the off time period Tf. This means that during the time period Td from the end of the first half cycle of the above described resonance to the end of the off time period both the diodes 9 and 10 become conductive simultaneously, thereby to short-circuit both terminals of the secondary winding 6b of the transformer 6.

Preferably, the primary and secondary windings 6a and 6b are coupled with a relatively large coupling coefficient. In such a situation, since the inductance of the primary winding is considerably decreased because of the above described short-circuiting of the secondary winding 6b, the resonance energy at the side of the primary winding 6a is accordingly decreased, with the result that the primary voltage V1 varies very little as if the same is substantially fixed. In other words, during the latter half cycle of the resonance, the resonance voltage wave form appearing across the primary winding 6a is damped by means of the diodes 9 and 10 provided at the side of the secondary winding 6b of the transformer 6. Therefore, if the inductance of the primary winding 6a of the transformer 6 is selected to be a relatively large value, this serves to reduce the damping function being achieved by the diode junction between the base and collector electrodes of the switching transistor 7.

Thus, the primary and secondary voltages V1 and V2 vary as shown in FIG. 3B and the diode voltage VD of a rectangular shape is developed across the diode 10, which is smoothed by the choke coil 11 and the capacitor 12 to provide a direct current output voltage V0. The choke current IL flows through the choke coil 11, as shown in FIG. 3B.

The output voltage Vo thus obtained may be expressed by the following equation.

$$Vo = \frac{Tn}{Tn + Tf} \times Vp = \frac{Tn}{Tn + Tf} \times \frac{Vi}{N}$$

Where N denotes a turn ratio of the primary and secondary windings 6a and 6b and Vp denotes a peak value of the diode voltage VD.

It would be appreciated that the above described equation means that even if the input voltages Vi varies the output voltage Vo can be controlled to be constant by varying the switching duty cycle i.e. Tn/(Tn+Tf) of the switching transistor 7. Such control is achieved by the control circuit 2 implemented by the blocks 16, 17, 18 and 19.

Referring again to the above described equation, it would further be appreciated that the peak voltage Vp developed across the diode 10 appears such that the wave area of the on time period and the wave area of the off time period Tf of the secondary voltage V2 become equal. This means that even if the present invention is applied to the switching regulated power supply apparatus of the opposite polarity type wherein the diode 9 is turned on when the switching transistor 7 is turned off similarly a constant output voltage Vo can be obtained by smoothing the diode voltage VD across the diode 10 by properly adjusting the switching duty cycle of the switching transistor 7.

Figure 4A:
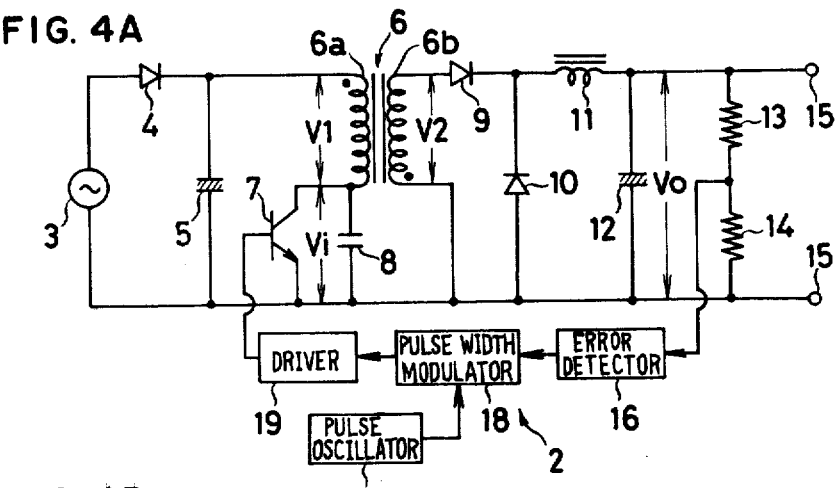
FIG. 4A shows a schematic diagram of another embodiment of a switching regulated power supply apparatus in accordance with the present invention.
Figure 4B:
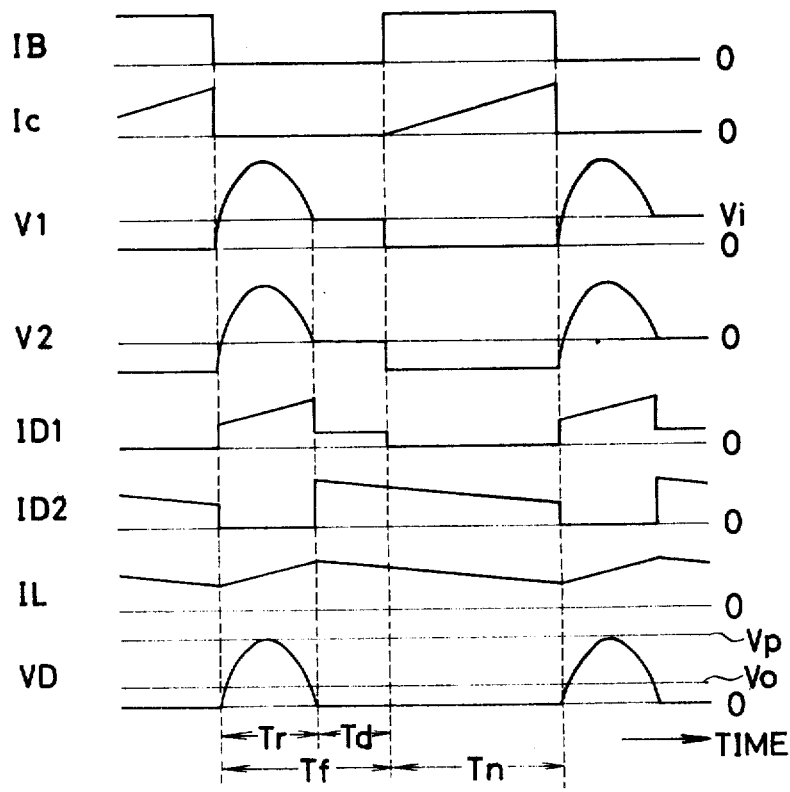
FIG. 4B shows wave forms of the signals appearing at several portions of the FIG. 4A embodiment.

FIG. 4A shows a schematic diagram of another embodiment of the switching regulated power supply apparatus in accordance with the present invention wherein the converter has been implemented in a reverse polarity operation type based on the above described consideration. FIG. 4B shows wave forms of the electrical signals appearing at several portions of the FIG. 4 embodiment. Referring to FIG. 4 in comparison with FIG. 3, the polarity of the primary and secondary windings 6a and 6b of the transformer has been selected as shown in the dot marks in the FIG. 4 while the remaining portions of the FIG. 4 embodiment are exactly the same as those shown in FIG. 3. Because of the reversed polarity of the primary and secondary windings 6a and 6b of the transformer 6, the diode 9 is turned on when the switching transistor is turned off, while the other diode 10 is turned on throughout the damping time period Td and the on time period Tn, inasmuch as the above described flyback pulse is obtained at the time when the diode current ID1 of the diode 9 is decreased after the lapse of the above described first half cycle period Tr of the resonance.

Figure 5A:
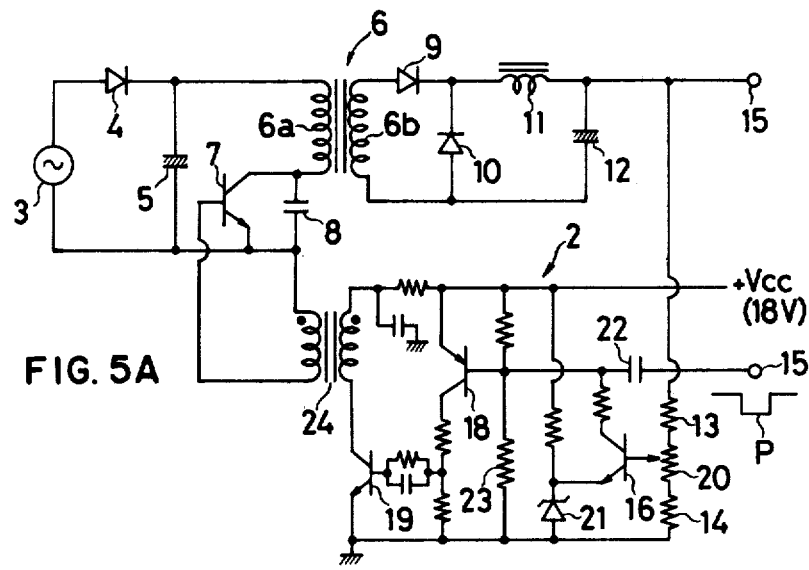
FIG. 5A shows a schematic diagram of a further embodiment of a switching regulated power supply apparatus in accordance with the present invention.
Figure 5B:
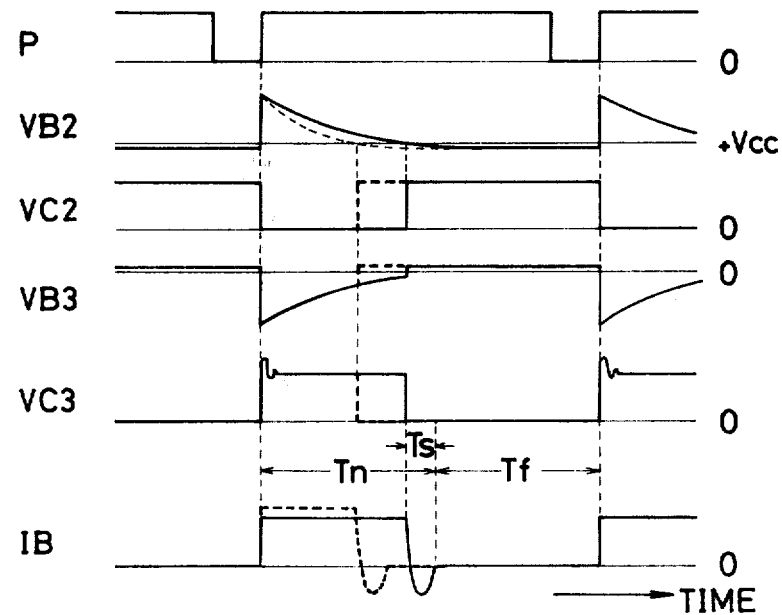
FIG. 5B shows wave forms of the signals appearing at several portions of the FIG. 5A embodiment.

FIG. 5A is a schematic diagram of the inventive switching regulated power supply apparatus showing the control circuit 2 in more detail. It is pointed out that the embodiment of the control circuit 2 shown in FIG. 5 can be equally employed in either the FIG. 3 embodiment of the same polarity operation converter type of the FIG. 4 embodiment of the opposite polarity operation converter type. Therefore, throughout the figures, like portions have been denoted by the same reference characters. FIG. 5B shows wave forms of the electrical signals appearing at several portions of the FIG. 5A embodiment.

Referring to FIGS. 5A and 5B, a potentiometer is implemented by a variable resistor 20 as well as the resistors 13 and 14. The signal obtainable from the sliding terminal of the variable resistor 20 is applied to the base electrode of an error amplifying transistor 16 which is connected such that the impedance between the collector and emitter electrodes thereof is controlled as a function of the difference between the reference voltage obtainable from a Zener diode 21 and the voltage obtainable from the sliding terminal of the variable resistor 20 of the potentiometer. Thus, the voltage divided signal of the output voltage Vo is applied to the base electrode of the transistor 16. The high frequency pulses P obtainable from the pulse generator, not shown, is applied through a differentiation circuit comprising a capacitor 22 and a resistor 23 to the base electrode of the pulse width modulating transistor 18, such that a differentiated output of the high frequency pulses P is applied to the base electrode of the transistor 18. The transistor 18 is connected such that the transistor 18 is threshold detected at the voltage level +Vcc. The base voltage VB2 of the transistor 18 varies in accordance with the differentiated output. Since the resistor 23 is shunted with the transistor 16, the pulse width of the threshold detected output pulses from the transistor 18 is varied as a function of the impedance between the collector and the emitter electrodes of the transistor 16 and thus the difference between the output voltage Vo and the reference voltage of the Zener diode 21. More specifically, the differentiated output having the ramp portion is applied to the transistor 18 as the base voltage VB2 the time constant of which is controlled as a function of fluctuation of the output voltage Vo. As a result a train of the high frequency pulses is obtained from the transistor 18 which has the pulse width as modulated as a function of the fluctuation of the output voltage Vo. The pulse width modulated collector output VC2 from the transistor 18 is voltage divided and applied as the base voltage VB3 to the base electrode of the driver transistor 19, the collector voltage VC3 of which is applied to the primary winding of a driving transformer 24. A secondary winding of the driving transformer 24 is connected to the base electrode of the switching transistor 7. As a result the base current IB flows to the base electrode of the transistor 7. The time period Ts is caused by the base storing effect of the switching transistor 7, which serves to extend the on time period Tn of the switching transistor 7 as compared with an ideal case as shown in FIGS. 3 and 4. Referring to FIG. 5B, the curves as shown in the dotted line show a case where the output voltage Vo is increased.

Figure 6:
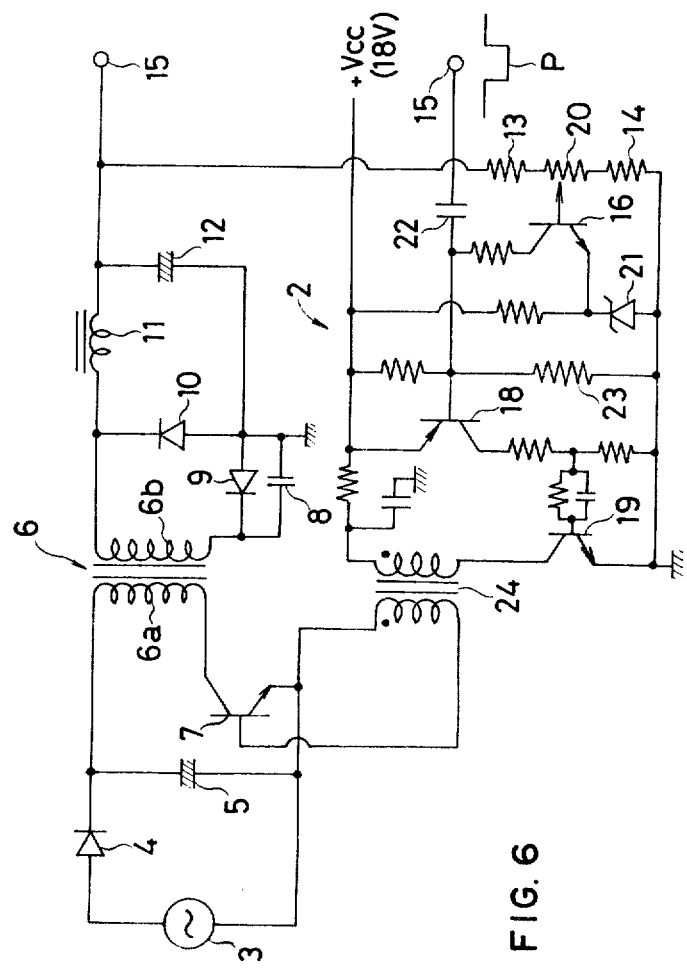
FIG. 6 shows a schematic diagram of a further embodiment of a switching regulated power supply apparatus in accordance with the present invention.

FIG. 6 shows a schematic diagram of another embodiment of the switching regulated power supply apparatus in accordance with the present invention. Referring to FIG. 6, the embodiment shown includes a resonance capacitor 8 which is connected in parallel with the diode 9, such that the resonance is caused to occur at the secondary side of the transformer 6. Except for the above described resonance with the secondary winding 6b of the transformer 6 and the capacitor 8 occurring at the secondary side of the transformer 6, substantially the same operation as described with reference to FIG. 5 occurs in the FIG. 6 embodiment. Hence, it is not believed necessary to describe the FIG. 6 embodiment in more detail.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A switching regulated power supply apparatus, comprising:

alternate current power supply means, first rectifying means coupled to said alternate current power supply means for rectifying the alternate current output, means for generating high frequency pulses the duty cycle of which is variable as a function of a control signal, first switching means coupled to said first rectifying means and responsive to said high frequency pulse output for on/off controlling the rectified output from said first rectifying means, high frequency transformer means coupled to receive the output from said first switching means, second rectifying means coupled to said high frequency transformer means for rectifying the transformed output from said high frequency transformer means, smoothing circuit means for smoothing the output of said second rectifying means and providing an output which is the average dc voltage output of said second rectifying means, means for supplying the rectified output from said smoothing circuit means to said high frequency pulse generating means as a control signal, resonance capacitor means coupled to said high frequency transformer means for causing resonance with said high frequency transformer when said first switching means is turned off, wherein resonance period is shorter than the off period of said first switching means, and second switching means coupled to the output of said high frequency transformer means and responsive to the turning off of said first switching means to be turned on for damping said resonance during the latter half cycle of resonance when said second rectifying means is conducting.

2. A switching regulated power supply apparatus in accordance with claim 1, wherein said high frequency transformer means comprises primary winding means, and secondary winding means electromagnetically coupled to said primary winding means.

3. A switching regulated power supply apparatus in accordance with claim 2, wherein said primary winding means of said high frequency transformer means is connected in series with said first rectifying means and said first switching means.

4. A switching regulated power supply apparatus in accordance with claim 3, wherein said high frequency transformer means is structured such that the polarity relation of said primary and secondary winding means of said high frequency transformer means is selected such that said second rectifying means becomes conductive when said first switching means is turned on.

5. A switching regulated power supply apparatus in accordance with claim 3, wherein said high frequency transformer means is structured such that the polarity relation of said primary and secondary winding means of said high frequency transformer means is selected such that said second rectifying means becomes conductive when said first switching means is turned off.

6. A switching regulated power supply apparatus in accordance with claim 3, wherein said capacitor means is connected to said primary winding means of said high frequency transformer means.

7. A switching regulated power supply apparatus in accordance with claim 3, wherein said capacitor means is connected to said secondary winding means of said high frequency tranformer means.

8. A switching regulated power supply apparatus in accordance with claim 7, wherein said capacitor means is connected in parallel with said second rectifying means.

9. A switching regulated power supply apparatus in accordance with claim 3, wherein said second rectifying means is connected in series with said secondary winding means of said high frequency transformer means, and said second switching means is connected in parallel with said series connection of said secondary winding means of said high frequency transformer means and said second rectifying means.

10. A switching regulated power supply apparatus in accordance with claim 3, wherein said second switching means comprises a diode.

11. A switching regulated power supply apparatus in accordance with claim 3, wherein said high frequency pulse generating means comprises reference pulse generating means for generating high frequency reference pulses, means coupled to said reference pulse generating means for differentiating the high frequency reference pulses, and means for threshold detecting the differentiated output from said differentiating means.

12. A switching regulated power supply apparatus in accordance with claim 11, wherein said high frequency pulse generating means comprises means responsive to the rectified output from said second rectifying means for varying the time constant of said differentiating means.

13. A switching regulated power supply apparatus as set forth in claim 1 wherein said smoothing circuit means comprises a choke coil and a smoothing capacitor connected in parallel with said second switching means, wherein the output of said apparatus is the voltage across said smoothing capacitor.

14. A switching regulated power supply apparatus as set forth in claim 6 wherein said capacitor means is connected in series with said primary winding means and in parallel with said first switching means.

15. A switching regulated power supply means as set forth in claim 8 wherein said capacitor means is connected in series with said secondary winding means.

* * * * *